(12) United States Patent     (10) Patent No.:    US 12,566,102 B2
Elkins                    (45) Date of Patent:      Mar. 3, 2026

(54) SYSTEMS AND METHODS FOR REMOTE MONITORING OF OIL AND GAS PLUNGER LIFT SYSTEMS

(71) Applicant: RSR equipment LLC, Aztec, NM (US)

(72) Inventor: Ronald Ray Elkins, Aztec, NM (US)

(73) Assignee: RSR EQUIPMENT LLC, Aztec, NM (US)

( * ) Notice: Subject to any disclaimer, the term of this patent is extended or adjusted under 35 U.S.C. 154(b) by 0 days.

(21) Appl. No.: 18/858,222

(22) PCT Filed: Feb. 29, 2024

(86) PCT No.: PCT/US2024/017869
§ 371 (c)(1),
(2) Date: Oct. 18, 2024

(87) PCT Pub. No.: WO2024/182606
PCT Pub. Date: Sep. 6, 2024

(65) Prior Publication Data
US 2025/0172454 A1      May 29, 2025

Related U.S. Application Data

(60) Provisional application No. 63/511,981, filed on Jul. 5, 2023, provisional application No. 63/487,724, filed on Mar. 1, 2023.

(51) Int. Cl.
*G01M 7/02*        (2006.01)
*E21B 43/12*       (2006.01)
(Continued)

(52) U.S. Cl.
CPC ........... *G01M 7/025* (2013.01); *E21B 43/121* (2013.01); *E21B 47/008* (2020.05); *F04B 47/12* (2013.01); *G01D 5/14* (2013.01)

(58) Field of Classification Search
CPC ...... E21B 43/121; E21B 47/008; E21B 47/06; E21B 43/12; E21B 23/001; E21B 23/14;
(Continued)

(56) References Cited

U.S. PATENT DOCUMENTS

| | | | |
|---|---|---|---|
| 7,219,725 B2* | 5/2007 | Chisholm | E21B 43/121 166/107 |
| 11,619,127 B1* | 4/2023 | AlTammar | E21B 34/06 166/250.1 |

(Continued)

OTHER PUBLICATIONS

International Search Report and Written Opinion dated Jun. 24, 2024 re PCT/US24/17869 (12 pages).
(Continued)

*Primary Examiner* — Andre J Allen
(74) *Attorney, Agent, or Firm* — Aurora Consulting LLC; Ashley Sloat; Albert Du

(57)           ABSTRACT

A system for the monitoring of plunger lift systems within an oil and gas well, the system may include an acoustic sensor securable to at least a portion of an external surface of a wellhead portion, a transmitter communicatively coupled to the acoustic sensor, and one or more batteries configured to provide electrical power to the acoustic sensor and the transmitter. The monitoring system may measure acoustic vibrations from the internal mechanism of oil and gas equipment with the acoustic sensor and may transmit the acoustic vibration measurements with the transmitter. The transmitted acoustic vibration measurements may be received by a vehicle stereo and reproduced by the speakers of the stereo, or the acoustic vibration measurements may be received by local or remote computing devices. Acoustic vibration measurements may be used to enable the tuning of one or more performance factors for the oil and gas equipment.

19 Claims, 5 Drawing Sheets

(51) Int. Cl.
    *E21B 47/008*     (2012.01)
    *F04B 47/12*     (2006.01)
    *G01D 5/14*     (2006.01)

(58) Field of Classification Search
    CPC ........ E21B 41/0078; E21B 7/061; E21B 7/18;
          E21B 47/009; E21B 43/26; E21B 41/00;
          E21B 2200/02; E21B 43/114; E21B
          43/13; E21B 43/127; E21B 47/12; E21B
          17/1085; E21B 47/09; E21B 2200/22;
          E21B 34/066; E21B 43/122; E21B 43/14;
          E21B 47/01; E21B 47/017; E21B 28/00;
          E21B 47/14; E21B 47/16; E21B 43/126;
          E21B 47/00; E21B 47/047; E21B 47/107;
          E21B 29/06; E21B 49/08; E21B 43/003;
          E21B 49/00; E21B 41/0035; E21B 43/01;
          E21B 47/001; E21B 43/119; E21B 47/13;
          E21B 7/046; E21B 7/064; E21B 7/065;
          E21B 17/042; E21B 43/128; E21B 47/10;
          E21B 23/03; E21B 2200/20; E21B 43/27;
          E21B 47/18; E21B 33/127; E21B 47/095;
          E21B 34/06; E21B 43/123; E21B 47/07;
          E21B 7/04; E21B 17/0283; E21B 33/10;
          E21B 33/12; E21B 43/00; E21B 43/112;
          E21B 43/24; E21B 23/00; E21B 34/10;
          E21B 34/16; E21B 43/16; E21B 49/003;
          E21B 33/1275; E21B 43/124; E21B
          43/385; E21B 47/11; E21B 47/135; E21B
          34/08; E21B 36/008; E21B 37/06; E21B
          41/02; E21B 43/129; E21B 43/243; E21B
          44/00; E21B 49/087; E21B 7/14; E21B
          47/092; E21B 47/26; E21B 43/38; E21B
          23/08; E21B 43/18; E21B 21/08; E21B
          33/124; E21B 34/00; E21B 41/0085;
          E21B 43/295; E21B 17/1078; E21B
          19/00; E21B 19/22; E21B 33/03; E21B
          36/04; E21B 37/00; E21B 43/20; E21B
          43/2406; E21B 49/0875; E21B 17/028;
          E21B 17/03; E21B 17/20; E21B 17/206;
          E21B 19/07; E21B 19/086; E21B 19/161;
          E21B 21/103; E21B 21/12; E21B
          2200/04; E21B 23/06; E21B 3/00; E21B
          33/068; E21B 33/1208; E21B 4/02; E21B
          4/18; E21B 43/017; E21B 43/1235; E21B
          43/34; E21B 44/005; E21B 47/08; E21B
          7/068; E21B 7/203; E21B 17/00; E21B
          33/122; E21B 43/25; E21B 47/0236;
          E21B 47/04; E21B 47/113; E21B 47/22;
          E21B 47/24; G01M 99/00; G01M 7/025
    See application file for complete search history.

(56) References Cited

U.S. PATENT DOCUMENTS

| | | | |
|---|---|---|---|
| 2014/0231079 A1 | 8/2014 | Scantlebury et al. | |
| 2015/0159473 A1 | 6/2015 | Hughes | |
| 2015/0285066 A1* | 10/2015 | Keller ..................... | E21B 47/16 |
| | | | 367/82 |
| 2015/0308257 A1 | 10/2015 | McCoy et al. | |
| 2017/0234118 A1 | 8/2017 | Part et al. | |
| 2018/0016889 A1 | 1/2018 | Mcdonald et al. | |
| 2018/0135409 A1* | 5/2018 | Wilson ..................... | G01V 3/30 |
| 2021/0293140 A1 | 9/2021 | Brown et al. | |
| 2022/0214474 A1 | 7/2022 | Nistala et al. | |
| 2022/0298906 A1 | 9/2022 | Zhong et al. | |

OTHER PUBLICATIONS

International Preliminary Report on Patentability re PCT/US2024/017869 issued Aug. 28, 2025 (8 pages).

* cited by examiner

SYSTEMS AND METHODS FOR REMOTE MONITORING OF OIL AND GAS PLUNGER LIFT SYSTEMS

CROSS-REFERENCE TO RELATED APPLICATIONS

This application is a 35 U.S.C. 371 National Stage filing for PCT Application Ser. No. PCT/US24/17869, filed Feb. 29, 2024, which claims the priority benefit of U.S. Provisional Application No. 63/487,724, filed Mar. 1, 2023, and U.S. Provisional Application No. 63/511,981, filed Jul. 5, 2023, the disclosure of each of which is herein incorporated by reference in its entirety.

TECHNICAL FIELD

This disclosure relates generally to the field of monitoring oil and gas equipment, and more specifically to the field of monitoring plunger lift systems within an oil and gas well. Described herein are systems and methods for monitoring oil and gas equipment.

BACKGROUND

Many oil and gas wells today utilize plunger lift systems for optimizing and maintaining production. Oil and gas plungers are used within the tubing of oil and gas wells to minimize liquid fallback, remove residue accumulation in the tubing, and, thus, lower bottomhole pressures. Current plunger lift systems have inherent challenges, with a common concern being the setting of production parameters. For example, oil and gas wells are typically operated in a cyclical process of shut-in (i.e., no-flow) and flow periods. An operator must tune the time periods for each part of the cyclical process. The production characteristics of every oil and gas well is different, and issues can arise if these time periods are not properly set for each well. A crucial aspect is the amount of liquid accumulation that occurs when the well is shut-in. For example, if the shut-in time for an oil and gas well is too short, there may not be enough liquid accumulation in the tubing, and the result may be the plunger arrival at the wellhead that is not damped by fluid above the arriving plunger. The result of not enough liquid accumulation in the tubing may be damage to the plunger and/or the wellhead equipment due to the plunger impacting at a high velocity. Some plunger assemblies (e.g., ball and sleeve plungers) may require a minimum velocity for proper actuation at the wellhead. For example, a ball and sleeve plunger may need to contact a separator rod in the wellhead with enough velocity to decouple the ball from the sleeve. In this example, if the shut-in period for a ball and sleeve plunger system is too long, excess fluid on top of the plunger may damp the impact so much so that the ball does not decouple from the sleeve. Decoupling the ball from the sleeve is crucial for ball and sleeve plunger operations.

The current method of tuning time periods for plunger lift systems requires, at least in part, operators to brace their ear to a portion of the wellhead to listen for sounds made by the plunger lift system transmitted through the tubing to the wellhead that indicate whether: not enough fluid accumulation has occurred, too much liquid accumulation has occurred, the well has logged off (i.e., no sounds produced by the plunger), or any other indications produced by a plunger. This method may require substantial time and patience from an operator as some portions of the plunger lift cycle may take about 15 to 30 minutes. Additionally, the quality of sound produced cannot be adjusted and is subject to the level of hearing that the operator has.

Accordingly, there exists a need to develop new devices and systems that address these long-known issues. Devices may need to be easily installed, portable, and suited for remote applications.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

The term "communicatively coupled" may be defined as either wireless communication (i.e., wirelessly coupled) between components or a wired connection between components.

Oil and gas wells (which may be referred to as "wells" herein) operated with plunger lift systems have inherent challenges, for example, the tuning of their operational timing. Wells operated with plunger lift systems may require optimization of shut-in periods (i.e., no-flow) and producing periods (i.e., flow). The tuning of the operational timing and identification of issues and/or unfavorable conditions for wells operated with plunger lift systems has been primarily performed by operators and their physical senses (e.g., hearing). Operators perform tuning operations and identify issues and/or unfavorable conditions for wells operated with plunger lift systems during all portions of the year and, in some instances, during inclement weather. Oil and gas well operation is fast-paced and requires multi-tasking to accomplish daily operations.

Figure 1:
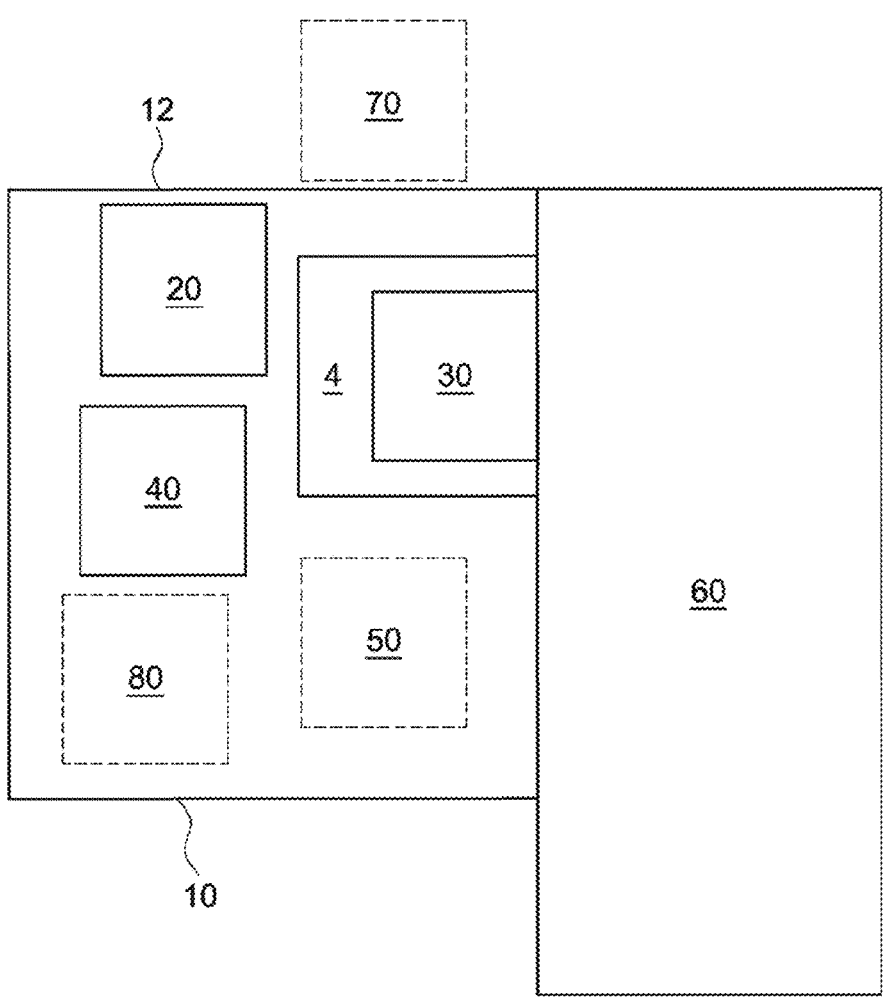
FIG. 1 illustrates a schematic of an embodiment of a system for remote monitoring of oil and gas plunger lift systems.

FIG. 1 illustrates a monitoring system 12 for oil and gas equipment (e.g., a plunger lift system in an oil and gas well).

The monitoring system 12 may include a housing 10, a transmitter 20, a sensor 30 (e.g., an acoustic sensor), a power supply 40 (e.g., one or more batteries, etc.), one or more optional sensors 50, an optional controller 80, and an optional solar panel 70. The monitoring system 12 couples to a piece of equipment for the purpose of monitoring one or more inner mechanisms of the piece of equipment. For example, the monitoring system 12 may couple to an oil and gas wellhead 60. The monitoring system 12 may couple to the wellhead 60 such that the sensor 30 is in contact with or near an external surface of the wellhead 60. In this example, when the plunger of the plunger lift system in the well moves within the tubing of the well, vibrations through the tubing are transmitted to the wellhead 60 and are sensed by the sensor 30 (e.g., an acoustic sensor). The tubing of oil and gas wells is typically a vibration responsive material, for example plain carbon steel, which is a favorable medium for acoustic vibration transfer. Other vibration responsive materials may include aluminum, copper, brass, and other alloys. The sensor 30 may be surrounded by insulation 4 on one or more sides. Examples of insulation 4 may include one or more of, or a combination thereof, a polyurethane foam, a melamine foam, a polyester wool, a fabric, or other damping material known in the art. The side of the sensor 30 facing the wellhead 60 or any other piece of equipment to be monitored may not include insulation 4. The insulation 4 may act to isolate the sensor 30 from other external vibrations. Isolating the sensor 30 (e.g., an acoustic sensor) from untargeted vibrations aids the sensor 30 in sensing clear and accurate measurements of acoustic vibrations transmitted from the tubing and/or wellhead 60. The sensor 30 is communicatively coupled to a transmitter 20 and may be within the housing 10. The transmitter 20 may be powered by the power supply 40 within the housing 10 and may transmit an electrical signal produced by the sensor 30. For example, the transmitter 30 may be a frequency modulation (FM) transmitter that produces a transmission that is receivable by a vehicle's stereo system or any other device capable of receiving frequency modulation. As such, if the FM receiver of the vehicle or device is set to the frequency that the transmitter 20 is producing, the acoustic vibrations measured by the sensor 30 (e.g., an acoustic sensor) may be transmitted by the transmitter 20 to, for example, the vehicle stereo or another device (e.g., a portable radio/stereo, a cellphone, etc.). Upon receiving the transmission from the transmitter 20, the vehicle stereo or speakers of another device may reproduce the measured acoustic vibrations through one or more speakers communicatively coupled to the vehicle stereo or another device. Reproducing the measured acoustic vibrations through one or more speakers reproduces the acoustic vibrations generated by the plunger through the tubing and/or wellhead medium. Thus, an operator may listen to the one or more speakers for, for example, tuning indications generated by the plunger within the tubing and/or wellhead. The output level (i.e., volume) of the one or more speakers may be adjusted by the vehicle stereo system or another device to adjust the volume of the reproduced sounds (i.e., the sounds produced by the acoustic vibrations). Volume adjustment may be advantageous as it can be amplified to levels higher than the point of measurement (i.e., at the point the sensor 30 is measuring), as such the reproduced sounds can be adjusted to be louder than even observed traditionally by, for example, an operator bracing their ear to the wellhead 60.

The monitoring system 12 may enable an operator to listen to the plunger lift system without physically engaging with the wellhead 60 (e.g., bracing their ear against the wellhead 60), without being in the same area as the wellhead 60, or even while remaining in or around the vehicle. The volume of the plunger produced sounds may be adjusted by the operator. The operator is capable of being mobile within the range of the transmissions. Some contemplated embodiments may include a controller 80 communicatively coupled to the sensor 30 (e.g., an acoustic sensor), to the power supply 40, and, in some embodiments, to the one or more optional sensors 50. Some contemplated embodiments may include a photovoltaic solar panel 70 for the recharging of the power supply 40 (i.e., one or more rechargeable batteries).

The sensor 30 as described herein is used to measure vibrations (e.g., acoustic vibrations). As such, sensors used by embodiments described herein may include microphones, accelerometers, magneto-electric vibration sensors, piezo-electric vibration sensors, and any other sensors for measuring/sensing acoustic vibrations. For example, an accelerometer may be used as an acoustic sensor to measure the accelerations of the sensor due to the acoustic vibrations. In some embodiments, a piezoelectric vibration sensor may be used as an acoustic sensor by matching an impedance of the equipment the embodiment is installed upon (e.g., tubing of a well, or the wellhead), as such the selected sensor may not properly match the impedance of air surrounding the monitoring system. Advantageously, the selected piezoelectric sensor may not activate, or may activate only in a reduced state, due to untargeted vibrations. Untargeted vibrations may be propagated by voices, site work noise, wind, other on-site process equipment, etc. Additionally, embodiments described herein may include additional hardware (e.g., amplifiers, preamplifiers, etc.) for the modifying of acoustic vibration measurements. For example, a contemplated embodiment may include a preamplifier between the acoustic sensor and the transmitter. The preamplifier may include an input impedance approximately matching the acoustic sensor impedance to accentuate the measured signal. In some embodiments, a microphone may be used as an acoustic sensor.

Embodiments described herein may utilize a multitude of different transmission types, including, amplitude modulation (AM) transmission, frequency modulation (FM) transmission, Bluetooth, WI-FI®, radio, cellular network transmission, or satellite network. Conventional oil and gas wells are equipped with equipment for telemetric communication systems. For example, telemetry is used in some oil and gas locations to relay data measured on location to a centralized network node where the data can be transmitted (e.g., by a cellular modem) to, for example, operation headquarters or a remote computing device (e.g., a cellphone). Conventionally, telemetry may be used to relay pertinent information (e.g., flow rates, fluid height in tanks, etc.) from remote locations to operation headquarters. It has been contemplated that embodiments herein may be equipped with an intermediate transmitter or transceiver, such as a radio modem, Bluetooth transmitter transceiver, or WiFi® modem as the transmitter 20 (shown in FIG. 1). The radio modem, acting as the transmitter 20, may transmit measurements from the acoustic sensor 30 (shown in FIG. 1) of embodiments herein to a centralized network node for further processing or may transmit to an on-location remote telemetry unit (RTU) in communication with a centralized network node. Further, the transmitter 20 of embodiments described herein may act as a transceiver and may not only transmit signals but may also have the capability of receiving signals from transmissions. In embodiments which include an optional controller 80 (shown in FIG. 1), signals received at the transceiver may be communicated to the optional controller 80. Signals received by the optional controller 80 may include command queries, for example, instructions from a master device may be received by monitoring system 12, and the optional controller 80 may respond with the queried information. Devices within telemetry networks often operate under Modbus protocol (or similar communication protocols) and embodiments used within telemetry systems may benefit from the ability to receive, process, and respond to commands transmitted to them. Additionally, systems of embodiments may be used in a hub/base station configuration. In other words, one or more or a plurality of hub monitoring system embodiments may transmit data to a monitoring system acting as a base station. The monitoring system acting as base station may include long-range transmission hardware, for example, a cellular modem. The base station monitoring system may transmit data received from the hub monitoring systems and the data the base station monitoring system has received to, for example, operation headquarters or a remote computing device (e.g., a cellphone). The base station monitoring system may include a controller 80 to execute communication protocols. Some of the described systems may work together as an acoustic monitoring network for a plurality of wells. A network of systems may include hub monitoring systems transmitting data to the base station monitoring system through communication protocols, such as, daisy-chains, in which data is relayed from one hub monitoring system to another hub monitoring system (sometimes repeatedly) to the base station monitoring system.

Some embodiments described herein may include a controller 80 (shown in FIG. 1). Controllers described herein may include one or more processors that can receive one or more inputs and output one or more outputs. The one or more processors of the controllers described herein may be used to execute stored instructions, perform calculations, and/or coordinate input/output operations. In embodiments with one or more optional sensors 50 (as shown in FIG. 1), the measurements of the one or more optional sensors 50 may be received by the controller 80. In some embodiments, the measurements of the one or more optional sensors 50 may be stored in a memory communicatively coupled to the controller 80, and/or transmitted through the transmitter 20 communicatively coupled to the controller 80 to a remote device.

Some embodiments may include a power supply 40 (e.g., one or more batteries) (as shown in FIG. 1) that are rechargeable. The power supply 40 may be recharged by a charging cable plugged into an external electrical circuit (i.e., a wall outlet, a vehicle's electrical system, etc.), when placed on or near an inductance charger, and/or may include a photovoltaic solar panel 70 (as shown in FIG. 1). Embodiments used outside and in direct or indirect sunlight may use a solar panel 70 to recharge the power supply 40. The use of a solar panel 70 may benefit embodiments deployed in semi-permanent installations (e.g., used in a telemetry network).

As shown in FIG. 1 and described herein, a housing 10 may be used to house one or more of: the transmitter 20, the acoustic sensor 30, the power supply 40, the one or more optional sensors 50, the optional controller 80, and may be used to mount the optional solar panel 70. Housings 10 described herein may include one or more portions. Embodiments with a single portion housing 10 may include a portion of the housing 10 approximately matching or shaped to receive an exterior surface of the piece of equipment that the monitoring system 12 may be installed on. For example, a wellhead 60 may include a standard sized pipe. The single portion housing 10 may include a recessed cylindrical portion substantially matching a shape or may be shaped to a receive (be a complementary shape to), the exterior of the standard sized pipe or a pipe of any size. The recessed cylindrical portion may include the acoustic sensor 30 and insulation 4. As such, when the housing 10 is coupled to the pipe of the wellhead 60 (e.g., by one or more straps, one or more magnets, etc.), the acoustic sensor 30 is placed on or near the exterior surface of the pipe and the insulation 4 is properly positioned to insulate the acoustic sensor 30 from external acoustic vibrations.

Some embodiments described herein may include a housing 10 with two or more portions. Housings with two or more portions may be hingedly coupled together and/or may interlock with each other. Each portion may include a sub-portion substantially matching, or complementary to, a shape of an external surface of the piece of equipment that the monitoring system 12 may be installed on. For example, if a housing 10 with two portions is used to install a monitoring system 12 onto the external surface of a pipe of a wellhead 60, each portion may include a recessed cylindrical sub-portion, and, as such, may encompass a portion of the pipe of the wellhead 60. The acoustic sensor 30 may be positioned within either sub-portion of the housing 10 and both portion of housing 10 may include insulation 4. As such, the acoustic sensor 30 can be positioned near or on the external surface of the standard size pipe of the wellhead 60, and the acoustic sensor 30 may be acoustically insulated from external acoustic vibrations.

Based on the reproduced acoustic vibrations by the monitoring system 12 illustrated in FIG. 1, an operator can diagnose a variety of issues or unfavorable conditions that may exist within a piece of oil and gas equipment. For example, a plunger lift system within an oil and gas well may be monitored with the monitoring system 12 to diagnose a variety of issues or unfavorable conditions. The monitoring system 12 may aid an operator in identifying a plunger arrival without sufficient fluid above the plunger as the plunger arrives at the wellhead 60 with a velocity greater than desired. The monitoring system 12 may aid an operator in identifying a plunger arrival with an excess of fluid on top of the plunger. The monitoring system 12 may aid an operator in identifying improper actuation of the plunger at the wellhead (e.g., improper decoupling of a ball and sleeve plunger). The monitoring system 12 may aid an operator in identifying the amount of time a plunger requires to reach the bottom of the wellbore and/or the tubing bumper spring. The monitoring system 12 may aid an operator in identifying other tuning or maintenance indicators. If the operator is made aware of any of the foregoing issues or unfavorable conditions, he/she can perform the appropriate tuning, adjustments, or maintenance to resolve such issues or conditions. Additionally, it has been contemplated that embodiments may include computing devices (e.g., a controller), or may transmit acoustic vibration measurements to remote computing devices, that are programmed with predetermined thresholds for identifying tuning indicators. As such, the computing device may, based on acoustic vibration data, autonomously recognize, for example, a plunger arrival without sufficient fluid above the plunger. The computing device may, based on acoustic vibration data, recognize (e.g., automatically), for example, a plunger arrival with an excess of fluid on top of the plunger. The computing device may, based on acoustic vibration data, recognize (e.g., automatically), for example, improper actuation of the plunger at the wellhead (e.g., improper decoupling of a ball and sleeve plunger). The computing device may, based on acoustic vibration data, recognize (e.g., automatically), for example, the amount of time a plunger requires to reach the bottom of the wellbore and/or the tubing bumper spring. The computing device may, based on acoustic vibration data, recognize (e.g., automatically), for example, any other tuning or maintenance indicators. The computing device may indicate the presence of any of the foregoing issues or unfavorable conditions and may generate or output suggested performance factor adjustments. Alternatively, embodiments may include computing devices, or may transmit to remote computing devices, that are communicatively coupled to control equipment and include the capability of adjusting one or more performance factors for the plunger lift system. Performance factors for the plunger lift system may include the time duration of shut-in. Performance factors for the plunger lift system may include the time duration of flow. Performance factors for the plunger lift system may include the time duration of afterflow. Performance factors for the plunger lift system may include any other factors effecting the plunger lift operation. The computing devices of these alternative embodiments may include machine learning capabilities or programmed with predetermined thresholds for identifying tuning indicators allowing the tuning of performance factors to be performed autonomously by the computing devices onto the control equipment of the oil and gas well.

The monitoring system 12 described in FIG. 1 may include one or more optional sensors 50. Sensors signals, such as an acoustic sensor signal, can be transmitted and reproduced by, for example, a vehicle stereo or other device, without translating the signal, storing the signal in memory, and/or translating the signal. This simple procedure of acoustic sensor signal transmission allows some embodiments to function without a controller 80. Some embodiments may utilize a controller 80 and within these embodiments, systems including one or more optional sensors 50 are contemplated. For example, embodiments may include optional sensors, for example, temperature sensors, magnetic field sensors (e.g., a plunger arrival sensor), pressure sensors, flow sensors, or any other sensors applicable for oil and gas equipment. Some embodiments may include a magnetic field sensor which measures the moment of magnetic material of the portion of equipment near the sensor. As such, magnetic field sensors may be used to measure indications of the presences of a plunger.

Systems and Devices

The systems and devices described herein function to monitor plunger lift systems in an oil and gas well. In some embodiments, the systems and devices function to transmit short range wireless transmissions to on-location receiving devices (e.g., a vehicle's stereo, a portable radio/stereo, a cellphone, etc.). In other embodiments, the systems and devices function to transmit long range wireless transmission to in-communication networks (i.e., telemetry, cellular, etc.). The systems and devices are used for monitoring plunger lift systems within oil and gas wells but can additionally, or alternatively, be used for any suitable applications. For example, monitoring systems described herein may be used on any other equipment with internal mechanisms that an operator may benefit from listening to.

Figure 2:
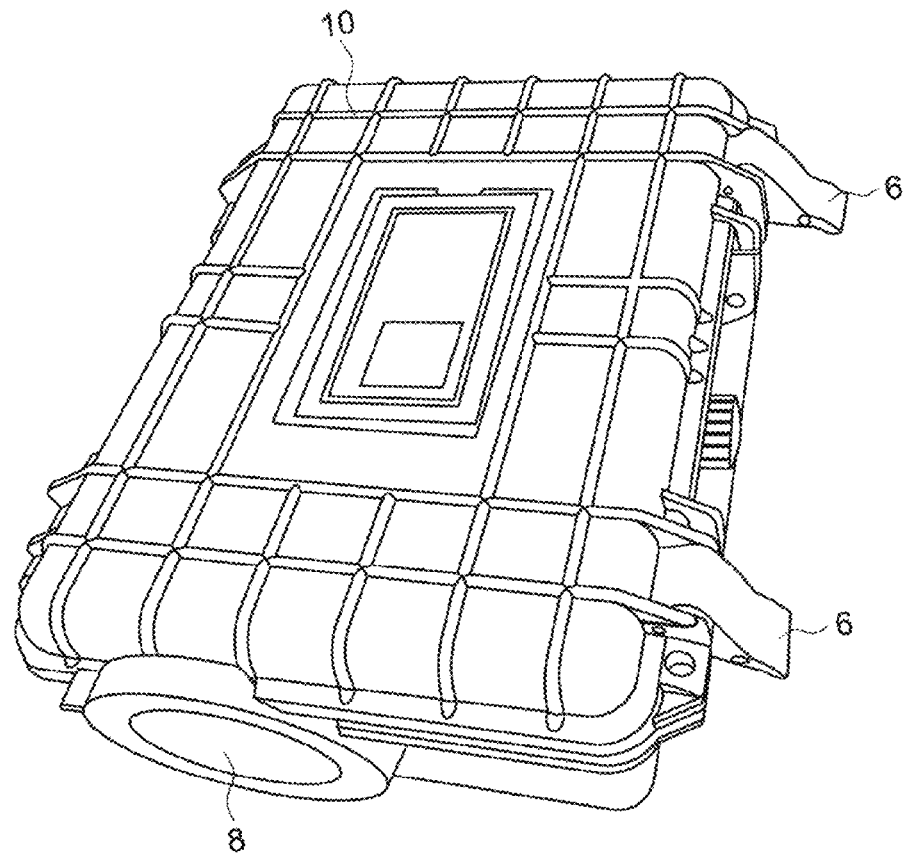
FIG. 2 illustrates the exterior of an embodiment of a monitoring system for oil and gas plunger lift systems.
Figure 3:
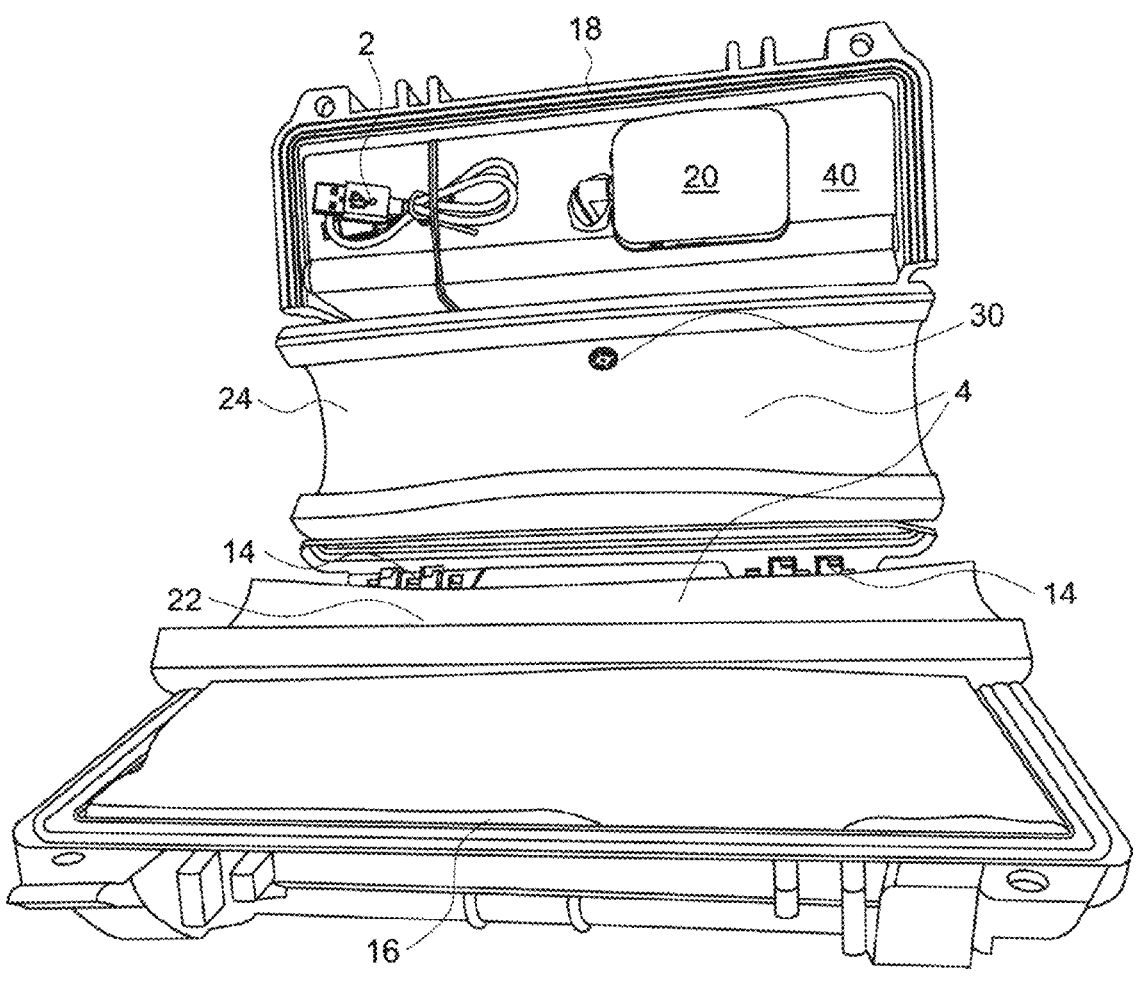
FIG. 3 illustrates an interior of an embodiment of a monitoring system for oil and gas plunger lift systems.

FIGS. 2 and 3 illustrate an embodiment of a monitoring system 12 for plunger lift systems in oil and gas wells. FIG. 2 illustrates a perspective view of the external elements of the monitoring system 12. The external elements of the monitoring system 12 include a first portion 16 of the housing 10, a second portion 18 of the housing 10, one or more hinges 14 (shown in FIG. 3), one or more coupling mechanisms 6, and an aperture 8 defined by the first and second portions 16, 18 of the housing 10. The first and second portions 16, 18 may be rigid or semi-rigid. The one or more coupling mechanisms 6, when engaged, hold the first portion 16 and second portion 18 of the housing 10 together. When the one or more coupling mechanisms 6 are disengaged, the first portion 16 and second portion 18 of the housing 10 may release from one another on a side of the housing 10 opposite the one or more hinges 14 (shown in FIG. 3), opening the housing 10, and exposing the internal elements of the monitoring system 12. Alternatively, the housing 10 could be formed of a first and second portion 16, 18 which decouple completely from each other and couple to each other on two sides instead of hinging with respect to one another. Alternatively, the housing may define an appropriately dimensioned slot in which, for example, a pipe of the wellhead 60 may slide into. The housing may be constructed of a flexible material to allow the pipe to slip into and be maintained within the housing. As shown in FIG. 3, the housing 10 is open and the internal elements are shown, including, an optional charging cable 2, a transmitter 20, a power supply 40, an acoustic sensor 30, and insulation 4. The aperture 8 (shown in FIG. 2) defined by the housing 10 is formed by recessed cylindrical sub-portions 22, 24 of the first portion 16 and the second portion of the housing 10, respectively. As shown in FIGS. 2 and 3, the defined aperture 8 is shaped to interface or receive the external surface of a cylinder, for example, a pipe of an oil and gas wellhead 60 (shown in FIG. 1). When the monitoring system 12 is attached to a piece of equipment to be monitored, for example a pipe of a wellhead 60, the first portion 16 and second portion 18 of the housing 10 clamp around the pipe and latch together with the one or more coupling mechanisms 6. When the first portion 16 and second portion 18 of the housing 10 are clamped together, the insulation 4 (e.g., compressible foam in the illustrated embodiment) is compressed between the first portion 16 and the second portion 18 of the housing and the external surface of the pipe. The acoustic sensor 30 is positioned in the recessed cylindrical sub-portion 24 of the second portion 18 of housing 10. The acoustic sensor 30 is positioned such that it has unobstructed contact with the external surface of the pipe (i.e., on or near the external face). With the acoustic sensor 30 positioned with unobstructed contact with the external surface of the wellhead 60 and with insulation 4 surrounding it, acoustic vibrations may be measured by the acoustic sensor 30 with reduced interference from external vibration sources.

In some embodiments, the housing 10 may form an at least partially air-tight seal around housed components (e.g., the power supply 40, the transmitter 20, the optional controller 80, the one or more optional sensors 50, the acoustic sensor 30, wiring between housed components, etc.). Enclosing electrical components and electrical wiring offers significant advantages in potentially explosive environments, such as those classified as Class 1 Division 2. By enclosing electrical components within robust housings or enclosures, these systems effectively contain any potential sources of ignition and separate them from potentially explosive fuel-air mixtures, reducing the risk of explosions and ensuring the safety of personnel and equipment operating in such areas. Materials used for the construction of the housing 10 may include characteristics such as being non-flammable, non-conductive, and/or non-corrosive. Housing 10 materials may include stainless steel, aluminum, plastic (e.g., polycarbonate, ABS, etc.), fiberglass reinforced polyester, fiberglass, polyvinyl chloride, rubber (e.g., silicone), or any other appropriate material. Additionally, the monitoring system 12 may incorporate additional safety elements to increase intrinsic safety. For example, appropriately specified eFuses (i.e., active circuit protection devices with integrated field-effect transistors used to limit currents, voltages to safe levels during fault conditions) may be incorporated within the monitoring system 12 to limit voltage and/or current to levels less than required for an arc to occur and/or less than required for a hot surface ignition to occur.

The embodiment of FIGS. 2 and 3 includes a frequency modulation (FM) transmitter 20. Oil and gas operators typically use work vehicles for transportation in the field, as such, the vehicle's stereo or other device may be tuned to the output frequency of the FM transmitter 20. Tuning the vehicle's stereo to the output frequency of the FM transmitter 20 allows acoustic vibrations measured by the acoustic sensor 30 to be transmitted to the stereo of the vehicle and to be output by the stereo through the stereo speakers. As such, a volume-controlled reproduction of the acoustic vibrations, generated through the tubing and wellhead medium by the plunger and measured by the acoustic sensor 30, may be produced by the vehicle's speakers. Reproducing the acoustic vibrations generated by the plunger within the tubing and/or wellhead of the well through the vehicle's speakers allows the operator to adjust the volume level to a preferable level and allows the operator to listen to the activity of the plunger without keeping their ear near or on the wellhead 60 (shown in FIG. 1). Additionally, the operator may be mobile within their vehicle or other device and/or within the range of the transmitter 20.

The embodiment shown in FIGS. 2 and 3 includes one or more rechargeable batteries as the power supply 40 and an associated charging cable 2. The associated charging cable 2 includes a universal serial bus (USB) for the charging interface plug. With the appropriate transformers, universal serial bus (USBs) are suitable for plugging into wall outlets and/or into a vehicle's electrical system. The illustrated monitoring device of FIGS. 2 and 3 may be suitable for temporary use on wells requiring the tuning of plunger lifts and may be transported, for example via an operator's vehicle between wells. As such, the monitoring device may be plugged into the vehicle's electrical system during transit between wells, charging the one or more rechargeable batteries of the power supply 40.

Figure 4:
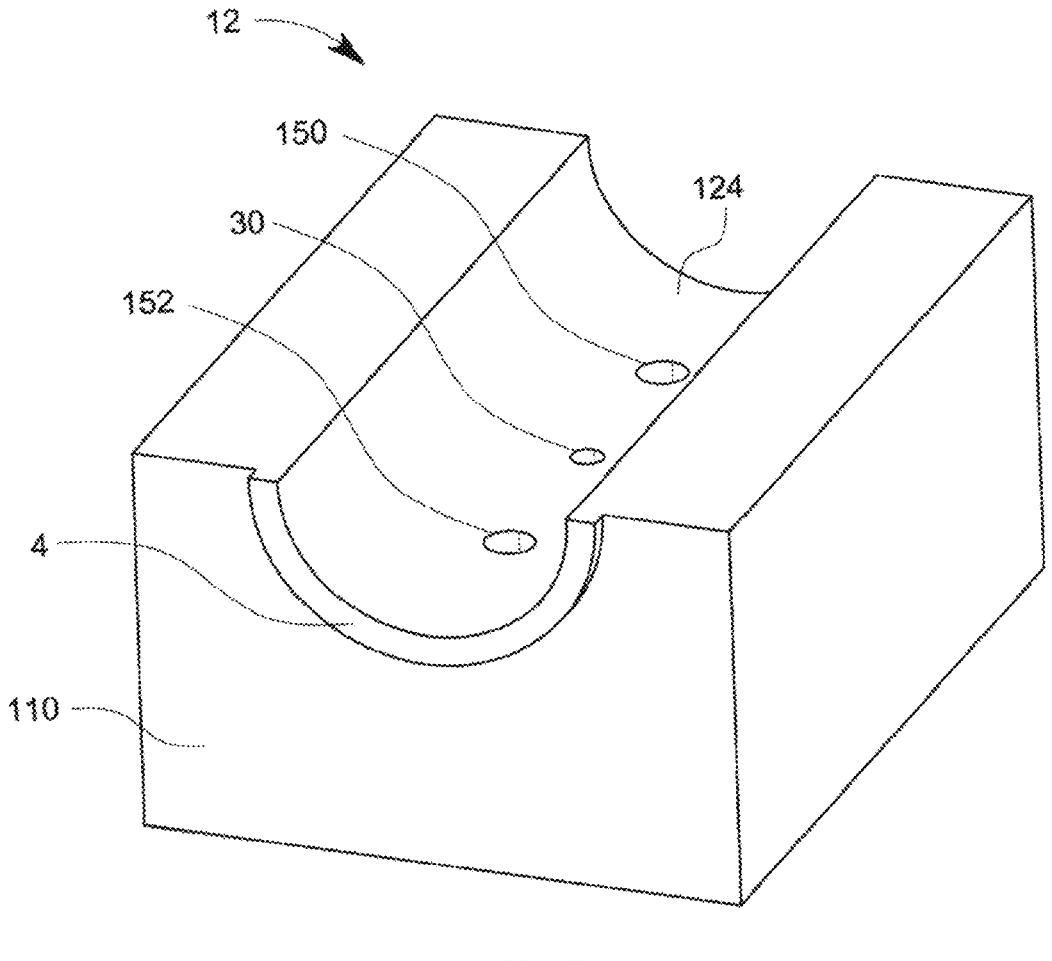
FIG. 4 illustrates an embodiment of a housing for a monitoring system for oil and gas plunger lift systems.

FIG. 4 illustrates an alternative embodiment of a housing 110 for the monitoring system 12. The housing 110 may not couple around a portion of the wellhead 60 (shown in FIG. 1) as described for the housing 10 of FIGS. 2 and 3, but instead may couple to a surface of the wellhead 60. The housing 110 may include a recessed cylindrical portion 124 approximately matching or shaped to receive an exterior surface of the piece of equipment that the monitoring system 12 may be installed on. The recessed cylindrical portion 124 may include insulation 4 lining an interior of the portion 124. The insulation 4 may surround a portion of the acoustic sensor 30 but the insulation 4 may not be placed such that the insulation is between the acoustic sensor 30 and the equipment (e.g., the wellhead 60) when the monitoring system 12 is installed. Being that wellheads 60 are traditionally constructed with steel, the recessed cylindrical portion 124 may include one or more magnets, for example, a first magnet 150 and a second magnet 152. The first magnet 150 and second magnet 152 may be countersunk within the insulation 4, such that the magnetic force causes compression of the insulation 4. As such, the monitoring system 12 may be installed on the wellhead 60 (shown in FIG. 1) by placing the housing 110 on the wellhead, such that the magnets 150,152 hold the system 12 in place. The housing 110, as described, may provide an appropriate coupling to the equipment to be monitored, while ensuring an appropriate separation from untargeted acoustic vibration sources.

Methods

Figure 5:
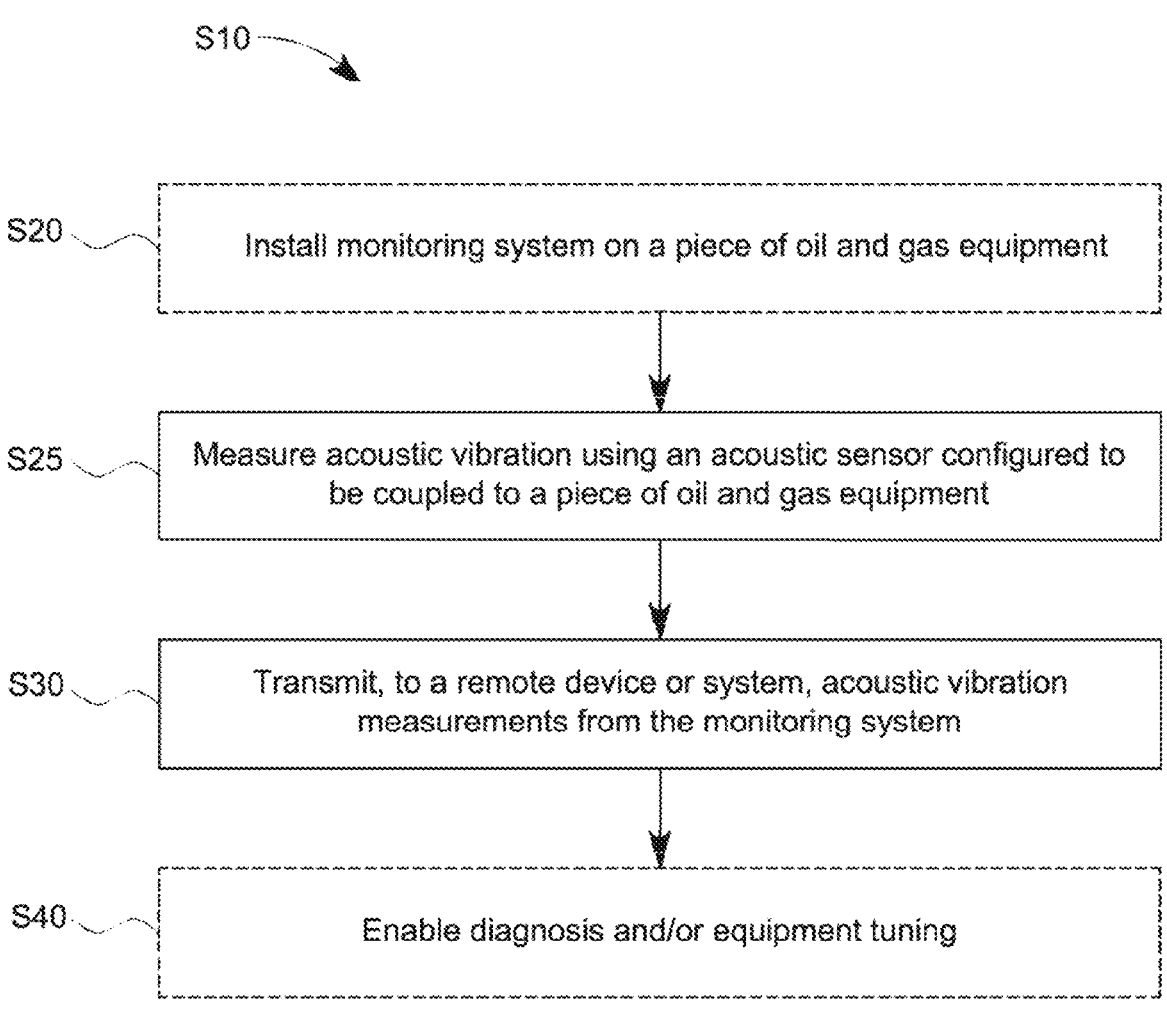
FIG. 5 illustrates a method of using an embodiment of monitoring an oil and gas plunger lift system.

As shown in FIG. 5, a method S10 for monitoring a piece of oil and gas equipment includes optionally installing a monitoring system on a piece of oil and gas equipment in block S20; measuring acoustic vibrations using an acoustic sensor in block S25; transmitting acoustic vibration measurements from the monitoring system to a remote monitoring system in block S30; and optionally diagnosing and/or tuning the equipment in block S40. The method S10 functions to monitor a plunger lift system in an oil and gas well. The method S10 is used for the oil and gas field but can additionally, or alternatively, be used for any suitable applications. The method S10 can be configured and/or adapted to function for any suitable operation.

As shown in FIG. 5, one embodiment of a method S10 for monitoring a piece of oil and gas equipment includes optional block S20, which recites installing a monitoring system on a piece of oil and gas equipment. Block S20 functions to install the monitoring system onto the piece of oil and gas equipment such that an acoustic sensor is positioned near or on an external surface of the equipment. As described above for FIGS. 1-4, the monitoring system couples to the wellhead such that the acoustic sensor is in contact with or near an external surface of the wellhead. The acoustic sensor may be partially surrounded by insulation but may not include insulation on the side directed toward the equipment (e.g., the wellhead). In some implementations, installing may include coupling at least an acoustic sensor and transmitter to a wellhead; securing a housing, including the acoustic sensor and transmitter, to the wellhead; or otherwise coupling a well monitoring system to the wellhead. Coupling the monitoring system to the wellhead may include the use of latches, straps, appropriately dimension slots/apertures, appropriately dimensioned recessed cylindrical portions, and/or magnets.

As shown in FIG. 5, one embodiment of a method S10 for monitoring a piece of oil and gas equipment includes block S25, which recites measuring acoustic vibrations using an acoustic sensor configured to be coupled to a piece of oil and gas equipment. Block S25 functions to measure acoustic vibrations from internal mechanisms of the oil and gas equipment using an acoustic sensor. As described for FIGS. 1-4, the acoustic vibration measurements may be measured by the acoustic sensor of the monitoring system. Acoustic sensors may include microphones, accelerometers, magneto-electric vibration sensors, piezoelectric vibration sensors, and any other sensors for measuring/sensing acoustic vibrations. Acoustic vibrations may be measured in terms of electrical current (e.g., from a microphone). Acoustic vibrations may be measured in terms of acceleration experienced upon the acoustic sensor (e.g., an accelerometer). Acoustic vibrations may be measured in terms of electrical current produced from material, such as crystal, under mechanical stress from acoustic vibrations (e.g., piezoelectric acoustic sensor).

As shown in FIG. 5, one embodiment of a method S10 for monitoring a piece of oil and gas equipment includes block S30, which recites transmitting, to a remote device or system, acoustic vibration measurements from the monitoring system. Block S30 functions to transmit acoustic vibration measurements from the monitoring device so that the acoustic vibration measurements may be received and/or analyzed. As described for FIGS. 1-4, the acoustic vibration measurements may be measured by the acoustic sensor of the monitoring system and transmitted by the transmitter of the system. The monitoring system may transmit the acoustic vibration measurements through a multitude of ways, for example, frequency modulation (FM). Method embodiments utilizing FM transmission may include receiving the acoustic vibration measurements with a remote device or system, for example the stereo of a vehicle or another device (e.g., a portable radio/stereo, a cellphone, etc.), and reproducing the acoustic vibration measurements with the speakers of the vehicle's stereo. As described elsewhere herein, other transmission modalities are also contemplated herein. Further, as described elsewhere herein, other remote devices or systems (e.g., networks, remote monitoring devices, etc.) may be configured to receive the transmitted acoustic vibrations.

As shown in FIG. 5, one embodiment of a method S10 for monitoring a piece of oil and gas equipment includes optional block S40, which recites enabling diagnosing and/or equipment tuning. Optional block S40 functions to enable a technician or other personnel to diagnose issues or unfavorable conditions recognized by the reproduced acoustic vibrations. Additionally, and in some instances, the equipment may be tuned, or maintenance performed based on the diagnosed issues or unfavorable conditions. As described for FIGS. 1-4, the monitoring system (based on the reproduced acoustic vibrations produced from within the equipment) may aid an operator in identifying a plunger arrival without sufficient fluid above the plunger. The monitoring system may aid an operator in identifying a plunger arrival with an excess of fluid on top of the plunger. The monitoring system may aid an operator in identifying improper actuation of the plunger at the wellhead (e.g., improper decoupling of a ball and sleeve plunger). The monitoring system may aid an operator in identifying the amount of time a plunger requires to reach the bottom of the wellbore and/or the tubing bumper spring. The monitoring system may aid an operator in identifying any other tuning or maintenance indicators. If the operator is made aware of any of the foregoing issues or unfavorable conditions, he or she can perform the appropriate tuning, adjustments, or maintenance to resolve such issues or conditions. The monitoring system may include computing devices (e.g., a controller), or may transmit acoustic vibration measurements to remote computing devices, that are programmed with predefined thresholds for identifying tuning indicators. As such, the computing device may, based on acoustic vibration data, automatically recognize, for example, a plunger arrival without sufficient fluid above the plunger. The computing device may, based on acoustic vibration data, automatically recognize, for example, a plunger arrival with an excess of fluid on top of the plunger. The computing device may, based on acoustic vibration data, automatically recognize, for example, improper actuation of the plunger at the wellhead (e.g., improper decoupling of a ball and sleeve plunger). The computing device may, based on acoustic vibration data, automatically recognize, for example, the amount of time a plunger requires to reach the bottom of the wellbore and/or the tubing bumper spring. The computing device may, based on acoustic vibration data, automatically recognize, for example, any other tuning or maintenance indicators. The computing device may indicate the presence of any of the foregoing issues or unfavorable conditions and may generate or output suggested performance factor adjustments.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor of the controller and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

References in the specification to "one embodiment," "an embodiment," "an illustrative embodiment," "some embodiments," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used in the description and claims, the singular form "a", "an" and "the" include both singular and plural references unless the context clearly dictates otherwise. For example, the term "acoustic sensor" may include, and is contemplated to include a plurality of acoustic sensors. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for monitoring a plunger lift system within an oil and gas well, the system comprising:

an acoustic sensor configured to be coupled to at least a portion of an external surface of a wellhead portion;

a transmitter communicatively coupled to the acoustic sensor;

insulation configured to surround the acoustic sensor;

a power source configured to provide electrical power to the acoustic sensor and the transmitter; and a housing comprising a portion configured to receive at least a portion of the wellhead portion.

2. The system of claim 1, wherein the portion of the housing is configured to receive the external surface of the wellhead portion.

3. The system of claim 2, wherein the housing is formed by two or more pieces that are configured to latch together.

4. The system of claim 2, wherein the acoustic sensor is positioned in the portion of the housing that is configured to receive the external surface of the wellhead portion.

5. The system of claim 2, further comprising one or more magnets that are configured to couple the system to the external surface of the wellhead portion.

6. The system of claim 5, wherein the one or more magnets are positioned in the portion of the housing that is configured to receive the external surface of the wellhead portion.

7. The system of claim 3, wherein the two or more pieces are hingedly coupled.

8. The system of claim 1, wherein the transmitter is one of; a frequency modulation transmitter, an amplitude modulation transmitter, a Bluetooth transmitter, a radio transmitter, and a cellular modem.

9. The system of claim 1, wherein the power source is rechargeable.

10. The system of claim 1, wherein the transmitter is a transceiver.

11. The system of claim 1, further comprising a magnetic field sensor.

12. A system for monitoring a plunger lift system within an oil and gas well, the system comprising:

an acoustic sensor configured to be coupled to at least a portion of an external surface of a wellhead portion;

a transmitter communicatively coupled to the acoustic sensor;

insulation configured to surround the acoustic sensor;

a power source configured to provide electrical power to the acoustic sensor and the transmitter; and a housing comprising a portion configured to receive at least the portion of the external surface of the wellhead portion.

13. The system of claim 12, wherein the housing is formed by two or more pieces that are configured to latch together.

14. The system of claim 13, wherein the two or more pieces are hingedly coupled.

15. The system of claim 12, wherein the acoustic sensor is positioned in the portion of the housing that is configured to receive the external surface of the wellhead portion.

16. The system of claim 12, further comprising one or more magnets that are configured to couple the system to at least the portion of the external surface of the wellhead portion.

17. The system of claim 12, further comprising one or more magnets that are configured to couple the system to at least the portion of the external surface of the wellhead portion.

18. The system of claim 17, wherein the one or more magnets are positioned in the portion of the housing that is configured to receive at least the portion of the external surface of the wellhead portion.

19. The system of claim 12, wherein the transmitter is one of: a frequency modulation transmitter, an amplitude modulation transmitter, a Bluetooth transmitter, a radio transmitter, and a cellular modem.

* * * * *